United States Patent Office 3,413,321
Patented Nov. 26, 1968

3,413,321
SELECTED 17-FLUORO-Δ¹⁶ STEROIDS
George A. Boswell, Jr., Wilmington, Del., assignor to E. I. du Pont de Nemours and Company, Wilmington, Del., a corporation of Delaware
No Drawing. Filed June 3, 1966, Ser. No. 554,968
12 Claims. (Cl. 260—397)

ABSTRACT OF THE DISCLOSURE

Described and claimed are
(1) the 17-fluoro-Δ¹⁶-steroids of the formulas

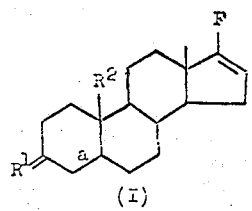

wherein

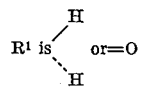

$R^2$ is hydrogen or methyl; and
$a$, the bond between carbons 4 and 5, is a single or a double bond;

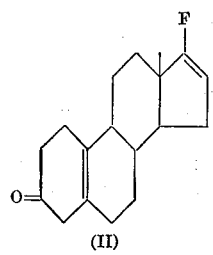

and

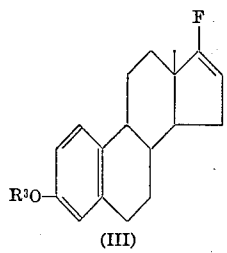

wherein
$R^3$ is hydrogen, lower alkyl or lower alkanoyl, lower alkyl referring to an alkyl group of 1–6 carbon atoms or a 5–6 carbon cycloalkyl group and lower alkanoyl referring to an acyl group of 1–6 carbon atoms;
(2) the process of preparing the 17-fluoro-Δ¹⁶-steroids of this invention which comprises dehydrofluorinating a suitable 17,17-difluorosteroid by contacting it with at least ten times its weight of neutral anhydrous alumina at a temperature of at least 0° C.

The 17-fluoro-Δ¹⁶-steroids of this invention possess useful and anti-androgenic and anti-gonadotrophic activities.

FIELD OF THE INVENTION

This invention relates to fluorinated steroids and to processes for preparing them. More specifically, the invention concerns selected steroid vinylene fluorides and their preparation.

SUMMARY AND DETAILS OF THE INVENTION

The compositions of this invention are 17-fluoro-Δ¹⁶ steroid compounds having structural formulae selected from the formulas consisting of:

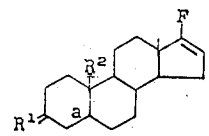

wherein $R^1$ is selected from the group consisting of

and =O; $R^2$ is selected from the group consisting of hydrogen and methyl; and $a$ represents a bond between carbons 4 and 5 selected from the group consisting of a single bond and a double bond;

(II)

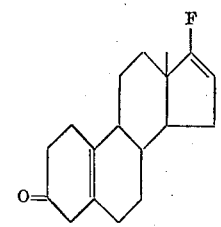

and (III)

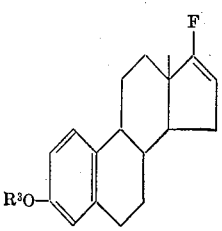

wherein $R^3$ is selected from the group consisting of hydrogen, lower alkanoyl and lower alkyl.

In the above definitions, the term "lower alkanoyl" refers to an acyl group of 1 through 6 carbon atoms, as for example, formyl, acetyl, propionyl, butyryl, isobutyryl or hexanoyl. The term "lower alkyl" refers to alkyl groups of 1 through 6 carbon atoms, as for example, methyl, ethyl, propyl, isopropyl, butyl or n-hexyl, or to a 5–6 member cycloalkyl group, i.e., cyclopentyl or cyclohexyl.

All of the compounds of the invention are prepared by the process aspect of the invention which comprises dehydrofluorinating the proper 17,17-difluoro steroid by contacting it with at least ten times its weight of neutral, anhydrous alumina at a temperature of at least 0° C , usually between 0° C. and 150° C.

Thus, to prepare the steroids of Formula I, reactants of the formula (IV)

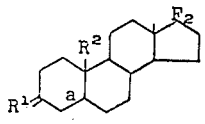

are employed; and to prepare the steroids of Formula III, reactants of the formula (V)

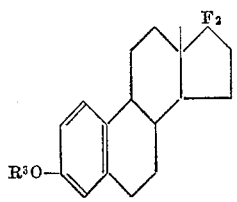

are used. The steroid of Formula II is obtained when the steroid of Formula IV employed is the one wherein $R^1$ is =O, $R^2$ is hydrogen and $a$ is a double bond, i.e., is 17,17-difluoro-4-esterene-3-one. The steroid of Formula II is formed concomitantly with 17-fluoro-4,16-estradiene-3-one, a steroid of Formula I.

The reaction is conducted under anhydrous conditions and therefore anhydrous neutral alumina must be employed. As is known, neutral alumina, such as the material used in chromatographic work, is supplied commercially in various grades whose "activities" depend chiefly on the water content [see, for example, Brockmann and Schodder, Ber. 74, 73 (1941)]. Only activity grade I alumina, which contains substantially no water, is suitable for use in the dehydrofluorination process of this invention. Hydrated aluminas, such as those of activity II–V, which contain, respectively, 3, 6, 10, and 15% of water, are unsuitable.

In the process of this invention, the alumina is used in a weight ratio relative to the 17,17-difluoro steroid of at least 10:1, preferably between 50:1 and 100:1. Much higher ratios can be used if desired, for example, up to 1000:1.

The reaction is conducted within the temperature range of about 0° C. to about 150° C. The choice of a specific reaction temperature depends primarily on the nature of the starting material.

The non-oxygenated 17,17-difluoro steroids, i.e., those of Formula IV where $R^1$ is

can be dehydrofluorinated at room temperature or lower. In this case, the process may be a chromatographic operation, i.e., a solution of the starting material in a suitable inert solvent, such as a liquid hydrocarbon, is adsorbed onto a column of neutral, activity I alumina and the reaction product is then eluted with the same or a different solvent after a brief residence time, which need not be more than a few minutes. Alternatively, a solution of the non-oxygenated starting material in the inert solvent, e.g., hexane or benzene, can be stirred with the alumina at ordinary or elevated temperature, e.g., up to 100° C., after which the alumina takes on a pink to purple color and, in the case of reaction on a column, the colored band moves down the column but fades as it is eluted. The eluate or solvent is then evaporated.

The oxygenated 17,17-difluoro steroids, i.e., those of Formula IV where $R^1$ is oxygen and those of Formula V, require more drastic dehydrofluorination conditions. In this case, a reaction temperature of at least 75° C. is usually employed, and with the 3-keto steroids of Formula IV it is preferred to operate above about 100° C. Longer contact times are also normally used for complete conversion to the 17-fluoro-$\Delta^{16}$ steroid. The reaction is best carried out by stirring at the requisite temperature a suspension of activity I alumina in a liquid hydrocarbon solvent such as benzene, toluene, xylene, octane, cyclohexane, or the like containing the oxygenated 17,17-difluoro steroid in solution. This operation can be conducted in a sealed vessel under autogenous pressure, but it is more convenient to operate at atmospheric pressure under reflux, using a solvent of suitable boiling point. Here again, the onset of the reaction is indicated by the fact that the alumina takes on a deep color varying from orange-red to violet, depending on the starting material. The optimum contact time depends on the particular compound being dehydrofluorinated, the solvent, the ratio of alumina to steroid and the temperature. The degree of conversion can be determined by removing a sample (solid and solvent) from the reaction mixture, isolating the product as described below and examining its infrared spectrum. In the higher temperature range, e.g., 125–150° C., a contact time of 15 minutes to 1 hour is generally sufficient for complete conversion, although the product will form in a lesser time. A much longer reaction time can be used, but it is advantageous, in the interest of high yields, not to prolong the heating unnecessarily.

With the oxygenated starting materials, the reaction product remains adsorbed on the alumina and is not present to an appreciable extent in the hydrocarbon solvent. These products are most conveniently isolated by separating the alumina by filtration and eluting the alumina with a neutral, polar oxygenated solvent which is preferably an alkyl ester of an alkanoic acid, such as ethyl acetate, methyl propionate, propyl acetate; an aliphatic ketone such as acetone or methyl ethyl ketone; an acyclic or cyclic ether such as diethyl ether, 1,2-dimethoxyethane or dioxane; and the like. The 17-fluoro-$\Delta^{16}$ steroid is then obtained by evaporating the eluate. It can be purified by conventional methods such as recrystallization or chromatography.

Alternatively, products of Formula I where $R^1$ is oxygen can be prepared indirectly by oxidation with sodium chromate of products of Formula I where $R^1$ is

Additionally, products of Formula III where $R^3$ is acyl or alkyl can be prepared from 17-fluoro-1,3,5,16-estratetraene-3-ol, i.e., the product of Formula III wherein $R^3$ is hydrogen, by known methods of acylation or alkylation.

The starting materials of Formula IV in which $R^1$ is =O are prepared by reacting the appropriate 17-keto steroids with sulfur tetrafluoride. Reactions of this type have been reported in the lietrature [Tadanier and Cole, J. Org. Chem. 26, 2436 (1961) and U.S. Patent 3,163,661; Martin and Kagan, J. Org. Chem. 27, 3164 (1962)] and these references describe at least one of the specific starting materials used in the process of this invention, viz., 17,17-difluoro-4-androstene-3-one. Other 17,17-difluoro-3-keto steroids not previously reported can be prepared by similar procedures (i.e., involving replacement of the 17-keto group by the gem-difluoro group) described in copending applications Ser. Nos. 444,422, now U.S. Patent No. 3,347,878 and 444,454 (now abandoned), filed by G. A. Boswell on Mar. 31, 1965. Detailed preparation of specific 17,17-difluoro-3-keto steroids are given in Examples B (Part I) and C, below.

Starting materials of Formula IV in which $R^1$ is

have been prepared by an indirect method involving the reaction of a 17,17-difluoro-3-keto steroid with ethylenedithiol in the presence of a boron trifluoride catalyst to give the corresponding 3-ethylenethioketal, followed by reductive desulfurization of the latter by treatment either with sodium in liquid ammonia or with Raney nickel, which contains sufficient adsorbed hydrogen to effect the reduction. Detailed preparations of two such 17,17-difluoro steroids are given in Example A and in Example B, Parts II and III.

The starting material of Formula V where $R^3$ is H, i.e., 17,17-difluoro-1,3,5(10)-estratriene-3-ol, may be synthesized from 1,-androstadiene-3,17-dione (a known compound) according to the recently published steroid aromatization procedure [J. Am. Chem. Soc. 86, 742 (1964)] using the radical anion derived from lithium metal and biphenyl in boiling tetrahydrofuran, whereby a $\Delta^{1,4}$-3-ketoandrostadiene is converted to a Δ^{1,3,5}-3-hydroxyestratriene, in accordance with the equation

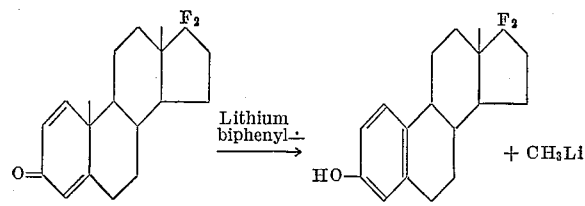

This reaction is preferably carried out in the presence of an acidic hydrocarbon such as diphenylmethane to capture the by-product methyllithium. This preparation is described in Example D below.

Example A.—17,17-difluoro-4-androstene

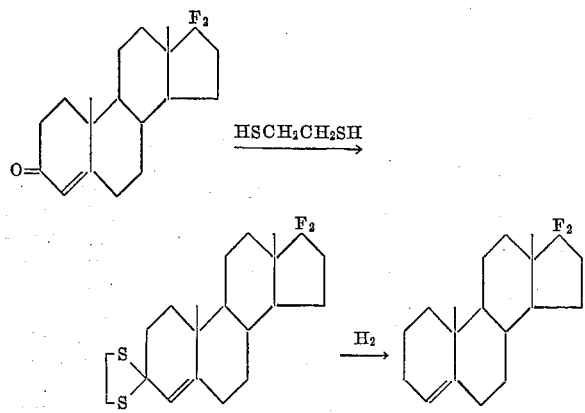

(I) A solution of 17,17-difluoro-4-androstene-3-one (1.0 g.) in glacial acetic acid (5 ml.) was treated with ethanedithiol (0.5 ml.) and boron trifluoride etherate (0.5 ml.) at 25° C., then warmed briefly on a steam bath. After allowing the mixture to stand at room temperature for 30 minutes, the crystals which had formed during that time were collected, washed with cold acetic acid and air-dried to yield 1.08 g. of 17,17-difluoro-4-androstene-3-one ethylenethioketal, M.P. 148–150° C. After recrystallization from ether-methanol, this product was obtained as colorless plates, M.P. 149–150.5° C., $[\alpha]_D^{24}$ +111° (c. 2.36, chf.).

Analysis.—Calcd. for $C_{21}H_{30}F_2S_2$: C, 65.6; H, 7.85; F, 9.87; S, 16.65. Found: C, 65.62; H, 7.89; F, 9.83; S, 16.85.

(II) A solution of 17,17-difluoro-4-androstene-3-one ethylenethioketal, prepared as described above (11.0 g.) in tetrahydrofuran (150 ml.) was added to a stirred suspension of Raney nickel (about 20 g.) in methanol (ca. 800 ml.). The mixture was stirred for 1.5 hours at room temperature, after which the catalyst was removed by filtration and the filtrate was evaporated to dryness under reduced pressure. The residue was dissolved in ether and the ethereal solution was washed with water, then with saturated sodium chloride solution, dried over magnesium sulfate and evaporated under reduced pressure to give a clear, colorless liquid. Chromatography on a silica-base adsorbent (300 g.) gave a crystalline material which was recrystallized from ether-methanol to afford 5.0 g. of 17,17-difluoro-4-androstene as large, colorless leaflets, M.P. 53.5–55° C., $[\alpha]_D^{24}$ +61° (c. 1.82, chf.), showing in the infrared $\lambda_{max.}^{Nujol}$ 8.55μ

An analytical sample was sublimed.

Analysis.—Calcd. for $C_{19}H_{28}F_2$: C, 77.6; H, 9.58; F, 12.90. Found: C, 77.41; H, 9.55; F, 12.95.

17,17-difluoro-androstane can be prepared in the same manner, starting with 17,17-difluoroandrostane-3-one (see Example C).

Example B.—17,17-difluoro-4-estrene-3-one and 17,17-difluoro-4-estrene

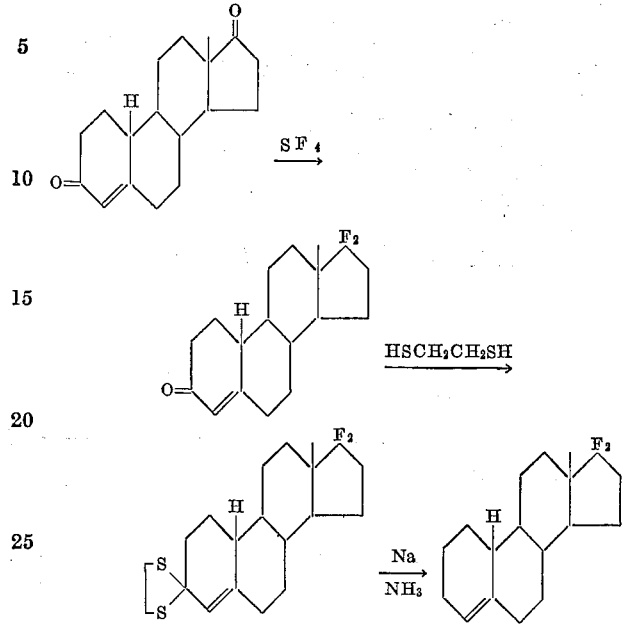

(I) A solution of 4-estrene-3,17-dione (4.7 g.) in methylene chloride (100 ml.) containing suspended water (1.5 ml.) was shaken with sulfur tetrafluoride (150 g.) in a pressure vessel at 20±2° C. for 30 hours. The reaction vessel was vented, swept out with a stream of nitrogen, and the contents were transferred to a separatory funnel. The methylene chloride solution was washed with water, 5% sodium bicarbonate solution, water and saturated salt solution. After drying over magnesium sulfate, the solution was evaporated to dryness under reduced pressure to give 17,17-difluoro-4-estrene-3-one, M.P. 148° C. after crystallization from acetone-hexane, yield 2.24 g. An analytical sample was recrystallized from the same solvent pair to five massive, colorless prisms, M.P. 156–157° C. (capillary tube), $[\alpha]_D^{23}$ +42° (c. 2.15, chf.).

Analysis.—Calcd. for $C_{18}H_{24}F_2O$: C, 73.4; H, 8.2; F, 12.9. Found: C, 73.63; H, 8.28; F, 12.79.

Infrared: $\lambda_{max.}^{Nujol}$ 5.98 (C–3 conj. C=O), 6.15 (conj. C=C) and 5.86μ (CF_2).

Ultraviolet: $\lambda_{max.}^{EtOH}$ 237 mμ (ε=17,200) and 285 mμ (ε= 244).

(II) 17,17-difluoro-4-estrene-3-one (1.0 g.) was converted to the ethylenethioketal by the procedure described in Example A, Part I. Recrystallization from ethermethanol gave 0.71 g. (first crop) of the thioketal, M.P. 166–168° C., $[\alpha]_D^{24}$ +90° (c. 2.12, chf.).

Analysis.—Calcd. for $C_{20}H_{28}F_2S_2$: C, 64.9; H, 7.35; F, 10.25; S, 17.30. Found: C, 64.94; H, 7.75; F, 10.26; S, 17.41.

(III) To a stirred suspension of the ethylenethioketal (3.90 g.) in dry ether (100 ml.) and liquid ammonia (1000 ml.) was added portionwise sodium metal (5 g.) in small pieces. The resultant mixture, which took on a deep blue color, was stirred for 1 hour, after which ethanol was added dropwise until the blue color was discharged. The ammonia was allowed to evaporate and the residual product was purified by chromatography on a silica-base adsorbent. Elution with hexane afforded 17,17-difluoro-4-estrene as a clear, colorless liquid which could not be obtained crystalline, $\lambda_{max.}^{CCl_4}$ 6.05, 9.15μ

The proton NMR spectrum in CDCl_3 showed a band at 5.39 p.p.m. (C–4 H) and a methyl peak at 0.91 p.p.m.

(C-18, doublet, J=1.7 c.p.s.). The F19 NMR spectrum at 56.4 mc./sec. in CDCl3 showed an AB quartet with lines centered at +5671, +5888, +6408, and +6626 c.p.s. with the low field pair being further split into triplets (J=23-24 c.p.s.) relative to trichlorofluoromethane (internal).

*Analysis.*—Calcd. for $C_{18}H_{26}F_2$: C, 77.1; H, 9.35; F, 13.53. Found: C, 76.72; H, 9.52; F, 13.52.

17,17-difluoroestrane can be prepared in the same manner starting with 17,17-difluoroestrane-3-one (see Example C).

Example C.—17,17-difluoroandrostane-3-one

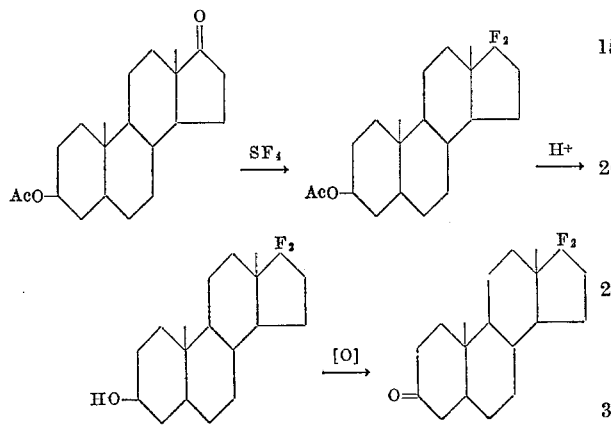

(I) A solution of 3β-acteoxyandrostane-17-one (10.0 g.) and methylene chloride (100 ml.) containing suspended water (1.5 ml.) was shaken with sulfur tetrafluoride (150 g.) at 20±2° C. for 3 hours. The reaction vessel was vented, swept out with a stream of nitrogen, and the contents transferred to a separatory funnel. The methylene chloride solution was washed with water, 5% sodium bicarbonate solution, water and saturated salt solution. After drying over magnesium sulfate, the solution was evaporated to dryness under reduced pressure to afford a dark syrup which crystallized spontaneously. The solid residue was thoroughly extracted with boiling hexane to effect a partial separation of the product and resinous material. The hexane extracts were concentrated to a small volume and then adsorbed onto a column of neutral alumina (200 g., activity III). Elution with hexane and hexane-benzene (2:1) afforded crystalline 3β-acetoxy-17,17-difluoroandrostane, yield 6.5 g. A portion was recrystallized from petroleum ether to give large colorless hexagons, M.P. 131° C., $[\alpha]_D^{23}$ −13° (c. 2.49, chf.).

*Analysis.*—Calcd. for $C_{21}H_{32}F_2F_2O$: F, 10.7. Found: F, 10.72.

Infrared: $\lambda_{max.}^{Nujol}$ 5.75 (OAc), 8.1 (OAc), and 8.55μ (CF2)

(II) A solution of 3β-acetoxy-17,17-difluoroandrostane (2.85 g.) and methanol (75 ml.) containing concentrated hydrochloric acid (15 ml.) was heated to reflux. Dropwise addition of water to the hot solution and cooling caused the product to precipitate. The precipitate of 17,17-difluoroandrostane-3β-ol was collected by filtration, washed with water and air-dried. This was recrystallized from hexane as fine needles, yield 1.22 g., M.P. 159–161° C., $[\alpha]_D^{23}$ −3° (c. 2.35, chf.).

*Analysis.*—Calcd. for $C_{19}H_{30}F_2O$: C, 73.0; H, 9.67; F, 12.15. Found: C, 72.78; H, 9.84; F, 11.66.

Infrared: $\lambda_{max.}^{Nujol}$ 3.0 (OH) and 8.60μ (CF2)

(III) 7,17-difluoroandrostane-3β-ol (5.1 g.) was oxidized at room temperature using an excess of Jones reagent (solution of 10.3 g. of chromium trioxide in 30 ml. of water and 3.7 ml. of concentrated sulfuric acid; see Bowden, Heilbron, Jones & Weedon, J. Chem. Soc. 1946, 39). Dilution of the reaction mixture with water caused the 17,17-difluoroandrostane-3-one to precipitate as colorless crystals, yield 3.49 g. This product was recrystallized from acetone containing a few drops of water to give long colorless blades, yield 2.68 g., M.P. 137° C., $[\alpha]_D^{23}$ +18° (c. 2.81, chf.). The analytical sample was sublimed.

*Analysis.*—Calcd. for $C_{19}H_{28}F_2O$: C, 73.6; H, 9.09; F, 12.2. Found: C, 73.29; H, 9.10; F, 12.4.

Infrared: $\lambda_{max.}^{Nujol}$ 5.82 (C=O) and 8.55μ (CF2)

17,17-difluoroestrane-3-one can be prepared in the same manner, starting with 3β-acetoxyestrane-3-one.

Example D.—17,17-difluoro-1,3,5(10)-estratriene-3-ol

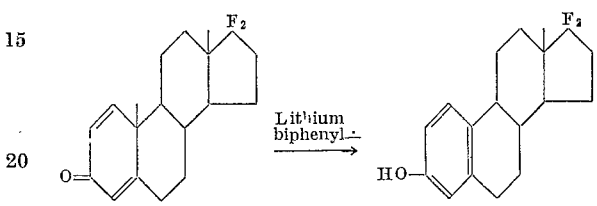

The starting material in this example, 17,17-difluoro-1,4-androstadiene-3-one, may be prepared as described by Tadanier and Cole, J. Org. Chem. 26, 2436 (1961).

A solution of 17,17-difluoro-1,4-androstadiene-3-one (2.34 g.) in dry tetrahydrofuran (50 ml.) and a solution of diphenylmethane (12.79 g.) in dry tetrahydrofuran (50 ml.) were added from separate dropping funnels at the same rate to a stirred solution of the radical-anion prepared by heating lithium metal (0.525 g., 75.5 mmoles), biphenyl (11.6 g., 75.5 mmoles) and dry tetrahydrofuran (100 ml.) to reflux under nitrogen until most of the metal had dissolved. The addition was completed in 30 minutes with the temperature being maintained around 40° C. Stirring of the deep blue solution was continued 3 hours, after which time the solution was poured into cold 5% hydrochloric acid, which discharged the blue color. The resulting mixture was extracted with ether and the extracts were washed with water, 5% sodium hydroxide solution (no estratrienol was extracted by this treatment), water and saturated salt solution. After drying over magnesium sulfate, the solvent was evaporated under reduced pressure, leaving a thick colorless syrup mixed with solid which was dissolved in hexane and chromatographed on a column of a silica-base chromatography adsorbent (100 g.). Elution with hexene (five 200-ml. fractions) returned a mixture of biphenyl and diphenylmethane. Elution with hexane-ether (4:1) returned in the first 200-ml. fraction a white solid whose infrared spectrum indicated it to be the desired 17,17-difluoro-1,3,5(10)-estratriene-3,ol. After recrystallization from hexane-acetone, the product was obtained as colorless leaflets, M.P. 160° C., yield 1.15 g. A portion was further purified by a second recrystallization from the same solvent pair, giving white needles, M.P. 167–167.5° C. (capillary tube), $[\alpha]_D^{24}$ +66° (c. 2.50, chf.). The analytical sample was sublimed.

*Analysis.*—Calcd. for $C_{18}H_{22}F_2O$: C, 73.8; H, 7.54; F, 12.9. Found: C, 74.02; H, 7.53; F, 12.99.

Infrared: $\lambda_{max.}^{Nujol}$ 3.05 (C–3 OH), 6.16 and 6.27 (aromatic, strong sharp doublet), 6.65 (aromatic, strong), 8.56 and 8.63μ (CF2, strong doublet).

Ultraviolet: $\lambda_{max.}^{EtOH}$ 281 mμ ($\epsilon$ =2120)

17,17-difluoro-1,3,5(10)-estratriene-3-ol can be esterified according to any of the known procedures to give 17,17-difluoro-1,3,5(10)-estratrienes in which the 3-carbon bears, for example, the acetoxy, propionoxy, butyroxy or hexanoyloxy group. Similarly, it can be etherified, for example, by treatment with an appropriate dialkyl sulfate, to give 17,17-difluoro-1,3,5(10)-estratrienes in which the 3-carbon bears, for example, the methoxy, ethoxy, butoxy, hexyloxy or cyclopentyloxy group.

EMBODIMENTS OF THE INVENTION

The following examples illustrate some products of the present invention and their preparation.

Example 1.—17-fluoro-4,16-androstadiene

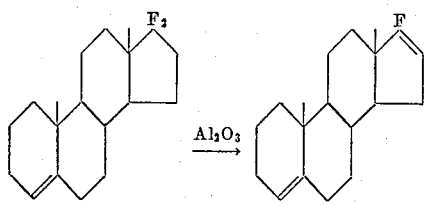

A petroleum ether soluiton of 4.28 g. of 17,17-difluoro-4-androstene (prepared as described in Example A) was adsorbed onto a column of neutral alumina (500 g.; activity I) at room temperature. After 30 minutes, the alumina was eluted with hexane and the eluate was evaporated. The residue was crystallized from ether-methanol to afford 17-fluoro-4,16-androstadiene (1.42 g.), M.P. 45–47° C., $[\alpha]_D^{24}$ +117° (c. 2.06, chf.). The infrared spectrum showed $$\lambda_{max.}^{Nujol} \ 6.05 \ and \ 9.15\mu$$

The proton NMR spectrum in CDCl$_3$ had bands at 5.32 (C–4 H, multiplet) and 4.86 p.p.m. (C–16 H, multiplet) and methyl peaks at 0.99 (C–18, singlet) and 1.05 p.p.m. (C–19, singlet) relative to internal tetramethylsilane. The F$^{19}$ NMR spectrum at 56.4 mc./sec. in CDCl$_3$ showed a single sharp peak at +7440 c.p.s. relative to internal trichlorofluoromethane.

*Analysis.*—Calcd. for C$_{19}$H$_{27}$F: C, 83.2; H, 9.89; F, 6.94. Found: C, 83.03; H, 9.88; F, 7.31.

A sample of this compound (obtained in another preparation) was purified by two chromatographies on neutral alumina (activity I) and recrystallization from ether-methanol. It melted at 75–76° C. and showed C, 83.20; H, 9.80; F, 6.88.

17-fluoro-16-androstene can be prepared in the same manner, starting with 17,17-difluoroandrostane.

Example 2.—17-fluoro-4,16-androstadiene-3-one

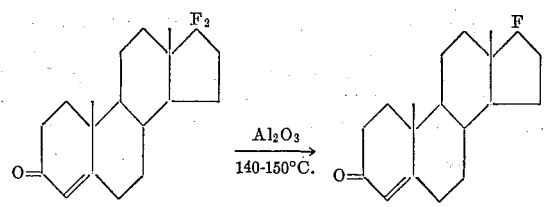

A mixture of 17,17-difluoro-4-androstene-3-one (5.0 g.), neutral alumina (460 g., activity I) and xylene (600 ml.) was heated to reflux with stirring for 3.5 hours. The total reaction mixture was then transferred to a bomb which was closed and heated at 150° C. with shaking for 24 hours. The alumina was removed by filtration and washed well with ethyl acetate. The filtrate and washings were combined, the solution was evaporated under reduced pressure and the residual oil was chromatographed on neutral alumina (activity III). Elution with hexane-benzene (2:1) returned a crystalline product which was recrystallized from hexane to give 0.231 g. of 17-fluoro-4,16-androstadiene-3-one as white needles, M.P. 131–133° C., $[\alpha]_D^{24}$ +146° (c. 2.0, chf.).

*Analysis.*—Calcd. for C$_{19}$H$_{25}$FO: C, 79.2; H, 8.73; F, 6.58. Found: C, 78.88; H, 8.66; F, 6.86.

Infrared: $\lambda_{max.}^{KBr}$ 6.0 (conj. C–3 C=O), 6.16 (C=C) and 9.15$\mu$ (C=C—F).

Ultraviolet: $\lambda_{max.}^{EtOH}$ 238 ($\epsilon$=15,700) and 285 m$\mu$ ($\epsilon$=360).

The F$^{19}$ NMR spectrum at 56.4 mc./sec. showed a resonance at 7400 c.p.s. above trichlorofluoromethane (external). The proton NMR spectrum showed two vinyl proton signals at $\tau$4.3 (C–4 H) and $\tau$5.15 (C–16 H) relative to tetramethylsilane (internal).

A better yield of this product was obtained by modifying the experimental conditions as follows: A mixture of 17,17-difluoro-4-androstene-3-one (10.0 g.), neutral, activity I alumina (500 g.) and dry xylene (800 ml.) was heated to reflux for 1 hour with stirring while sweeping the system with a slow stream of dry nitrogen. As the reaction mixture approached reflux temperature, the alumina developed a deep red-orange color. After the reaction mixture had cooled to room temperature, it was transferred to a chromatography column using benzene to assist in the transfer. The benzene-xylene solution was collected and evaporated to dryness under reduced pressure, yielding but a trace of yellow solid. Elution of the alumina with ethyl acetate brought off a total of 8.0 g. of mixed oil and solid. This was dissolved in benzene and the solution was adsorbed onto neutral alumina (300 g., activity I). Elution with hexane-benzene (1:1) and benzene followed by two crystallizations of the solute from aqueous methanol afforded 4.5 g. of 17-fluoro-4,16-androstadiene-3-one, M.P. 126–128° C., showing an infrared spectrum identical to that of the material prepared as described above.

Example 3

The product of Example 2 was also prepared by oxidation of 17-fluoro -4,6 - androstadiene, in accordance with the equation

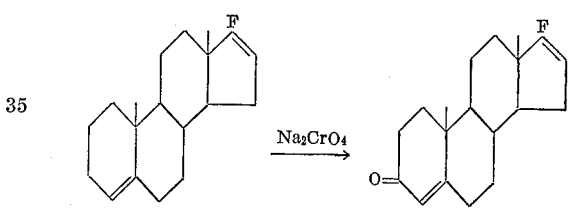

A solution of 17-fluoro-4,6-androstadiene (1.0 g.) in a mixture of acetic acid (12.6 ml.) and acetic anhydride (6.8 ml.) containing sodium chromate (1.05 g.) was stirred for 24 hours at 30±5° C. The reaction mixture was diluted with water and extracted with methylene chloride. The extract was washed successively with water, 5% sodium bicarbonate solution and saturated sodium chloride solution, dried over magnesium sulfate, and evaporated to dryness under reduced pressure to afford an oily product which was purified by chromatography on neutral alumina (activity III). Elution with hexane-benzene (1:1) gave a colorless crystalline product (0.31 g.) which was recrystallized from hexane to afford 17-fluoro-4,16-androstadiene-3-one, M.P. 131–132° C. The analytical sample was sublimed.

*Analysis.*—Calcd. for C$_{19}$H$_{25}$FO: C, 79.2; H, 8.73; F, 6.58. Found: C, 79.32; H, 8.78; F, 6.66.

Example 4.—17-fluoro-4,16-estradiene

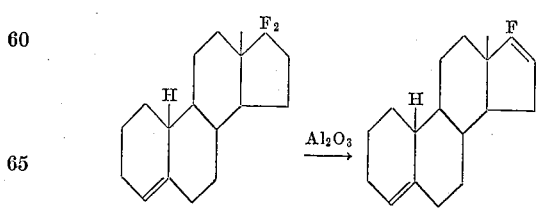

The crude, oily 17,17-difluoro-4-estrene obtained by desulfurization of 11.0 g. of 17,17-difluoro-4-estrene-3-one ethylenethioketal as described in Example B, Part III, was dissolved in hexane and the solution was adsorbed onto a column of neutral alumina (1000 g., activity I) at room temperature. Elution of the column with hexane followed by evaporation of the eluate yielded 4.4 g. of 17-fluoro-4,16-estradiene as a clear, colorless liquid, $[\alpha]_D^{24}$ +90° (c. 2.16, chf.), showing in the infrared $$\lambda_{max.}^{CCl_4} 3.24, 3.27, 6.05 \text{ and } 9.15\mu$$

The proton NMR spectrum in CDCl$_3$ showed broad bands at 5.40 (C–4 H) and 4.85 p.p.m. (C–16 H) and a methyl peak at 0.95 p.p.m. (C–18, singlet). The F$^{19}$ NMR spectrum at 56.4 mc./sec. CDCl$_3$ showed a single sharp peak with a shoulder at +7450 c.p.s. relative to trichlorofluoromethane (internal).

*Analysis.*—Calcd. for C$_{18}$H$_{25}$F: F, 7.28. Found: F, 7.30.

17-fluoro-16-estrene can be prepared in the same manner, starting with 17,17-difluoroestrane.

Example 5.—17 - fluoro - 4,16 - estradiene - 3 - one and 17-fluoro-5(10),16-estradiene-3-one

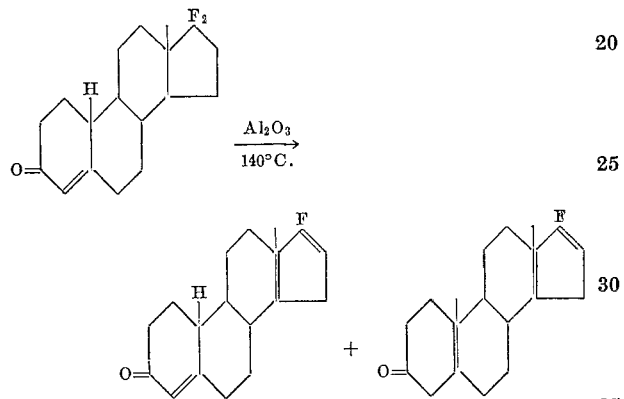

To a stirred suspension of neutral alumina (500 g., activity I) in dry xylene (200 ml.) was added in one portion 10.0 g. of 17, 17-difluoro-4-estrene-3-one, prepared as described in Example B, Part I. The mixture was heated under nitrogen atmosphere to reflux, at which temperature the alumina took on an orange-red color. An aliquot (a mixture of alumina and xylene) was taken after 15 minutes of reflux, the alumina was removed by filtration and rinsed with ethyl acetate, and the filtrate and rinsings were combined and evaporated to dryness under reduced pressure to leave a yellow oil whose infrared spectrum indicated that approximately 50% of the starting material had been dehydrofluorinated. After an additional 15 minutes at reflux, an aliquot was again taken and processed as described above. The infrared spectrum indicated complete conversion of a 17-fluoro-$\Delta^{16}$ product.

The reaction mixture was then cooled to room temperature and poured into a chromatography column, using benzene to assist in the transfer. The benzene-xylene solution was collected and evaporated to dryness under reduced pressure to afford a small amount of crystalline solid. Elution with ethyl acetate caused the alumina to fade to a pale yellow and delivered 5.5 g. of a mixture of yellow oil and crystals which was dissolved in a little benzene. The benzene solution was absorbed onto neutral alumina (activity III). Elution with hexane-benzene (2:1) returned a colorless solid which, upon crystallization from hexane, afforded 17-fluoro-5(10), 16-estradiene-3-one, M.P. 170° C. (0.347 g. in the first crop and 0.142 g. in the second crop). The analytical sample was sublimed, M.P. 180–181° C., $[\alpha]_D^{23}$ +69° (c. 0.52, chf.).

Analysis.—Calcd. for C$_{18}$H$_{23}$FO: C, 78.8; H, 8.44; F, 6.92. Found: C, 78.60; H, 9.01; F, 6.55.

Infrared: $\lambda_{max.}^{Nujol}$ 3.22 (C–16 vinyl hydrogen), 5.85 (non-conj. C–3 (C=O), 6.04 ($\Delta^{16}$), 9.10$\mu$ (C=C—F)

The F$^{19}$ NMR spectrum at 56.4 mc./sec. (CDCl$_3$) exhibited a single sharp resonance at +7441 c.p.s. from trifluorochloromethane (internal standard). The proton NMR spectrum in CDCl$_3$ had a methyl peak at 1.00 (C–18, singlet) and a broad multiplet centered at 4.86 p.p.m. (C–16 H).

Elution with hexane-benzene (1:1) returned a colorless crystalline solid which, after recrystallization from aqueous methanol, afforded 2.2 g. of 17-fluoro-4, 6-estradiene-3-one, M.P. 80° C. An analytical sample was sublimed and recrystallized from petroleum ether to give long, colorless needles, M.P. 103.5–104.5° C., $[\alpha]_D^{23}$ +98° (c. 0.63, chf.).

Analysis Calcd. for C$_{18}$H$_{23}$FO: C, 78.8; H, 8.44; F, 6.92. Found: C, 79.16; H, 8.03; F, 6.93.

Infrared: $\lambda_{max.}^{Nujol}$ 6.03 (conj. C–3 C=O), 6.06 (shoulder C=C—F), 6.19 ($\Delta^4$) and 9.10$\mu$ (=C—F, doublet).

Ultraviolet: $\lambda_{max.}^{EtOH}$ 239 m$\mu$ ($\epsilon$ 17,600)

The F$^{19}$ NMR spectrum at 56.4 mc./sec. (CDCl$_3$) showed a single sharp peak at +7444 c.p.s. from trifluorochloromethane (internal). The proton NMR spectrum showed a sharp peak at 1.05 (C–18, singlet), a multiplet centered at 4.90 (C–16 H) and multiplet centered at 5.87 p.p.m. (C–4 H) from tetramethylsilane (internal).

Example 6.—17-fluoro-4, 16-estradiene-3-one was also prepared, free from the $\Delta^{5(10)}$ isomer, by oxidation of 17-fluoro-4, 16-estradiene in accordance with the equation

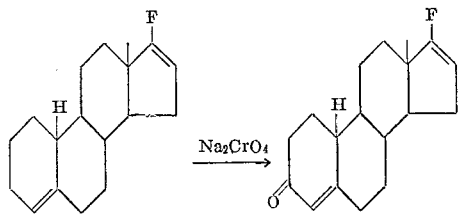

To a stirred solution of 17-fluoro-4, 16-estradiene (1.26 g.) in glacial acetic acid (17 ml.) and acetic anhydride (9.2 ml.) was added portionwise 1.43 g. of sodium chromate. The reaction mixture was stirred at 30±3° C. for 24 hours and the product was isolated with methylene chloride as described in Example 3. Evaporation of the methylene chloride solution under reduced pressure gave an oily product which was purified by chromatography on neutral alumina (activity III). Elution with hexane-benzene (2:1 and 1:1) returned solids which were combined. A portion was sublimed as a mixture of oils and crystals. The infrared and ultraviolet spectra and the F$^{19}$ and H$^1$ NMR spectra showed that the product was 17-fluoro-4, 16-estradiene-3-one.

Example 7.—17-fluoro-16-androstene-3-one

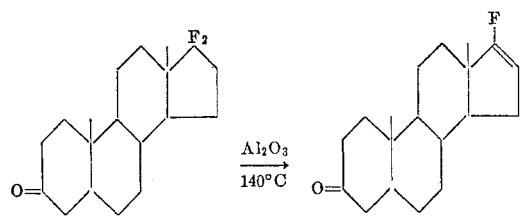

A stirred solution of 0.5 g. of 17, 17-difluoroandrostane-3-one (prepared as described in Example C) in dry xylene containing suspended neutral alumina (5 g., activity I) was heated to reflux under nitrogen for 16 hours. An aliquot removed and processed as described in Example 5 afforded a partially crystalline solid whose infrared spectrum showed it to be mainly 17-fluoro-16-androstene-3-one $[\alpha]_{max.}^{CCl_4}$ 5.85 (C–3 C=O), 6.05 (C=C—F), 9.10$\mu$ (C=C—F)

The total reaction product was chromatographed on neutral alumina (30 g., activity III). Elution with hexane-benzene (2:1) returned a solid material which was recrystallized from methanol-methylene chloride to give 0.077 g. of 17-fluoro-16-androstane-3-one as fine colorless needles, M.P. 229–234° C. Elemental analysis showed that this product contained a small amount of the unchanged starting material.

Analysis.—Calcd. for $C_{19}H_{27}FO$: C, 78.7; H, 9.35. Found: C, 76.36; H, 9.09.

17-fluoro-16-estrene-3-one can be prepared in the same manner, starting with 17,17-difluoroestrane-3-one.

Example 8.—17-fluoro-1,3,5(10), 16-estratetraene-3-ol

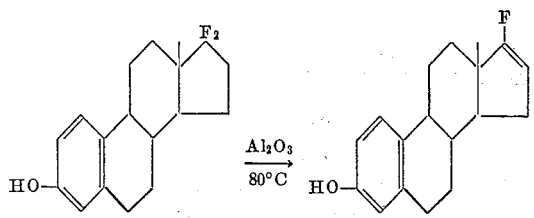

A stirred solution of 17,17-difluoro-1,3,5(10)-estratriene-3-ol (1.0 g.; prepared as described in Example D) in dry benzene (30 ml.) containing neutral alumina (10 g., activity I) was heated to reflux under nitrogen. The alumina turned pink in color after 30 minutes. After 16 hours of reflux, the reaction mixture was processed essentially as described in Example 5. There was obtained a crystalline solid whose infrared spectrum indicated it was 17-fluoro-1,3,5(10),16-estratetraene-3-ol.

Infrared: $\lambda_{max.}^{CHCl_3}$ 2.85, 2.95 (—OH), 3.25, 3.30 (shoulder, =C—H), 6.05 (C=C—F), 6.20, 6.30, 6.66 (aromatic ring), 9.10μ (C=C—F).

From this compound, esters such as 3-acetoxy- or 3-hexanoyloxy-17-fluoro-1,3,5(10),16-estratetraene and ethers such as 3-methoxy- or 3-hexyloxy-17-fluoro-1,3,5(10),-16-estratetraene can be obtained by conventional acylation or alkylation procedures.

The 17-fluoro-$\Delta^{16}$ steroids of this invention in which the A-ring is not aromatized [those of Formulae I and II] possess anti-androgenic activity, as demonstrated by tests on male rats. Anti-androgenic activity is shown by the fact that these compounds are able to inhibit the hormonal action of simultaneously administered testosterone propionate in castrate male rats, and to inhibit endogenous androgen in intact male rats. The degree of androgen inhibition is determined by measuring the ability of the compound to block the testosterone-induced hypertrophy of the ventral prostate and seminal vesicles in the castrate male rat and to inhibit the normal growth of these glands in the immature intact male rat.

As is known, anti-androgenic steroids are valuable agents in the therapeutic treatment of prostatic carcinoma [see, for example, the article by Huggins in Cancer Research 16, 825 (1956)] and have been proposed in the treatment of other disorders such as post-puberal and idiopathic hirsutism in women, the Stein-Leventhal syndrome, and adolescent and premenstrual acne [see, for example, Saunders et al., Steroids 3, 687 (1964), listing leading references].

The 17-fluoro-$\Delta^{16}$ steroids of Formula III possess anti-gonadotrophic properties and also block implantation in the female rat, which make them useful as agents for controlling fertility.

The foregoing detailed description has been given for clearness of understanding only and no unnecesary limitations are to be understood therefrom. The invention is not limited to the exact details shown and described, for obvious modifications will occur to those skilled in the art.

The embodiments of the invention in which an exclusive property or privilege is claimed are defined as follows:

1. A 17-fluoro-$\Delta^{16}$ steroid having a structural formula selected from the class consisting of

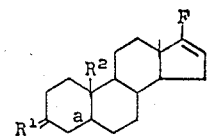

wherein $R^1$ is selected from the group consisting of

and =O; $R^2$ is selected from the group consisting of hydrogen and methyl; and $a$ represents a bond between carbons 4 and 5 selected from the group consisting of a single bond and a double bond;

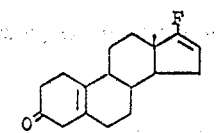

and

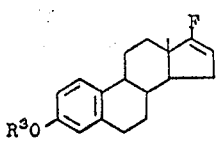

wherein $R^3$ is selected from the group consisting of hydrogen, lower alkanoyl and lower alkyl.

2. The steroids of claim 1 having the formula

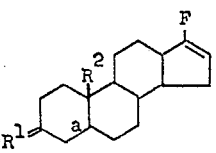

3. The steroids of claim 2 wherein $R^1$ is =O.
4. The steroids of claim 2 wherein $R^2$ is hydrogen.
5. The steroids of claim 2 wherein $R^2$ is methyl.
6. The steroids of claim 1 having the formula

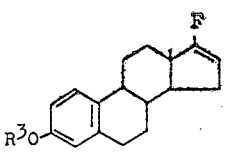

7. The steroid of claim 6 wherein $R^3$ is hydrogen.
8. The steroid of claim 1 having the formula

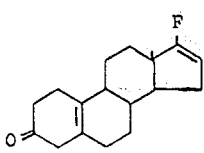

9. The steroid of claim 2 wherein $R^1$ is

$R^2$ is methyl and $a$ is a double bond.

10. Process of preparing a 17-fluoro-Δ¹⁶-steroid which comprises reacting a steroid selected from the class consisting of

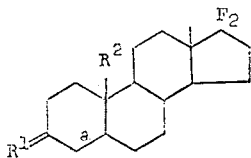

and

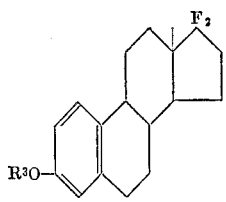

wherein R¹ is selected from the group consisting of

and =O; R² is selected from the group consisting of hydrogen and methyl; $a$ represents a bond between carbons 4 and 5 selected from the group consisting of a single bond and a double bond; and R³ is selected from the group consisting of hydrogen, lower alkanoyl and lower alkyl, with neutral, anhydrous alumina in an amount of at least ten times the weight of said steroid, at a temperature of between 0° C. and 150° C., under anhydrous conditions in the presence of an inert solvent and separating the steroid product from the anhydrous alumina reactant.

11. The process of claim 10 wherein the steroid reactant is

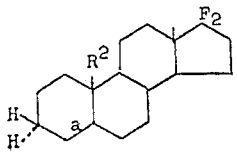

12. The process of claim 10 wherein R¹ is =O and wherein the temperature is between 75° C. and 150° C.

References Cited

UNITED STATES PATENTS 3,055,916   9/1962   Bowers et al.

OTHER REFERENCES

Shoppee et al.: J. Chem. Soc. (1961), 1583–1590 (p. 1584 relied on).

Tadanier et al: J. Org. Chem., 26, 2436–2439 (1961) (p. 2439 relied on).

Bowers: J. Am Chem Soc., 81, 4107 (1959).

Joly et al.: Bull. Soc. Chim, 28, 569 (1961).

Nakanishi et al.: Chem. & Ind. [1960], 1136.

Ringold et al.: J. Am. Chem. Soc, 81, 3485 (1959).

LEWIS GOTTS, *Primary Examiner.*

E. G. LOVE, *Assistant Examiner.*